United States Patent [19]

Kohn

[11] 4,204,900

[45] May 27, 1980

[54] METHOD OF PRODUCING THIN BALSA WOOD SHEETS

[75] Inventor: Jean Kohn, New York, N.Y.

[73] Assignee: Baltek Corporation, Northvale, N.J.

[21] Appl. No.: 11,936

[22] Filed: Feb. 13, 1979

[51] Int. Cl.[2] .......... B32B 31/00; B27D 1/00; B27D 9/00

[52] U.S. Cl. .......... 156/255; 144/317; 144/325; 144/326 R; 428/535

[58] Field of Search .......... 156/255; 428/535, 7; 144/309 S, 311, 312, 317, 325, 326 R, 209 R

[56] References Cited

U.S. PATENT DOCUMENTS 3,908,725 9/1975 Koch .......... 156/255

FOREIGN PATENT DOCUMENTS 469646 11/1950 Canada .......... 144/317

*Primary Examiner*—Douglas J. Drummond

*Attorney, Agent, or Firm*—Michael Ebert

[57] ABSTRACT

A high-yield, low-cost technique for converting balsa wood logs into thin, flat sheets usable in model-making. In this technique, the log is first debarked and then cut to a standard bolt length. The bolt is supported for rotation in a veneer lathe which acts to peel off in spiral form a continuous web of balsa veneer. After kiln drying, dried sheets taken from this web are clipped to a usable width, the sheets at this point having a curvature as a result of their spiral memory. Then the sheets are assembled into matching pairs of opposing curvatures, each pair of sheets being laminated together in face-to-face relation to produce a two-ply flat sheet whose planarity, upon exposure, is immune to changes in relative humidity and temperature.

7 Claims, 6 Drawing Figures

Fig. 1.
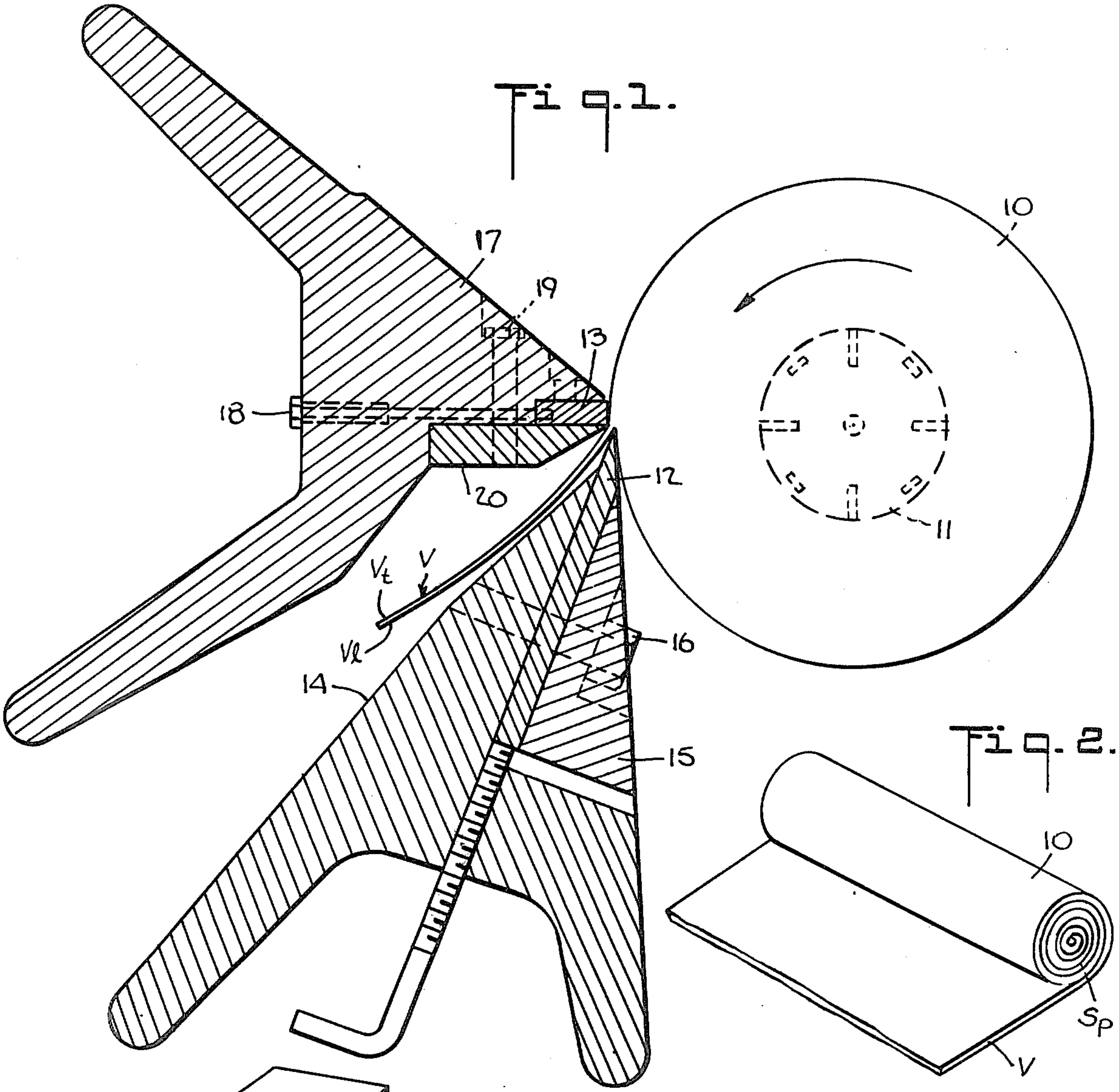
Fig. 2.
Fig. 6.
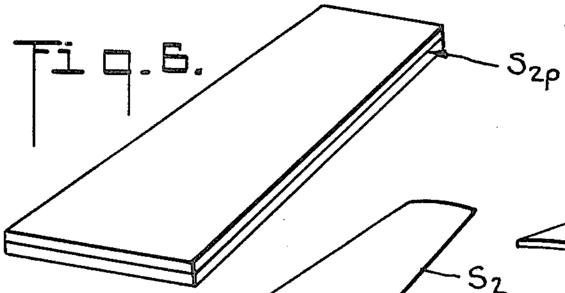
Fig. 3.
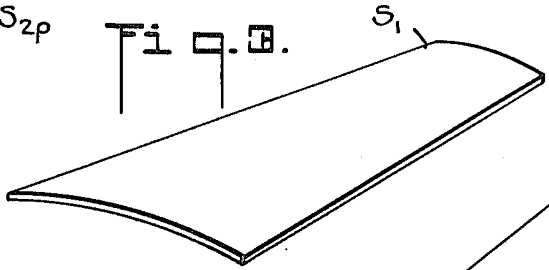
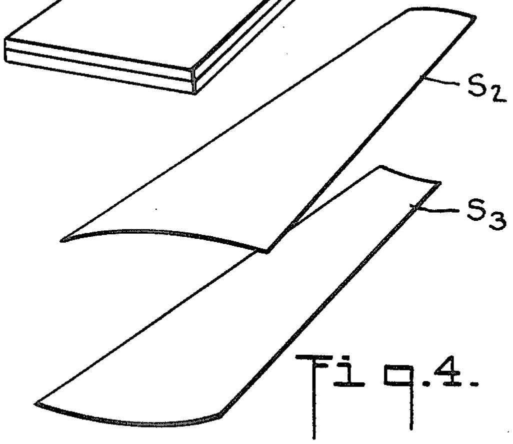
Fig. 4.
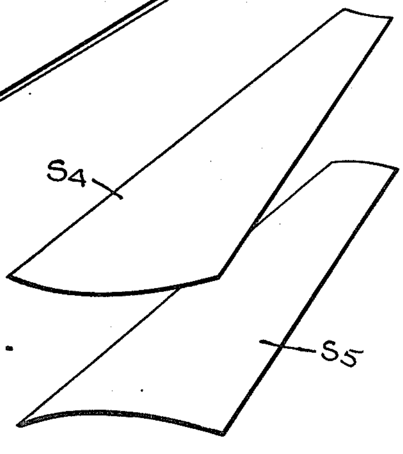
Fig. 5.

METHOD OF PRODUCING THIN BALSA WOOD SHEETS

BACKGROUND OF INVENTION

This invention relates generally to the production of sheets of balsa wood usable in the construction of models and in other applications requiring a veneer of balsa wood, and in particular to a high-yield-low-cost technique for converting balsa logs into such sheets.

In making model airplanes, the preferred material is balsa wood; for this wood has unique structural properties ideally suited for this application. On the average, it weighs less than 9 pounds per cubic foot, this being 40% less than the lightest species of wood in North America. Its cell structure affords a combination of high rigidity, compressive and tensile strength superior to any composite or synthetic material of equal or higher density.

Balsa wood sheets are not only popularly used in the making model airplanes but are often employed in constructing model cars and boats as well as in the fabrication of architectural models for one can readily cut and profile balsa sheets into pieces of any desired shape and then glue or otherwise join the pieces together. Balsa wood sheets are also used as feedstock for multi-ply, light-weight plywood.

The present practice in producing balsa wood sheets usable for model-making or plywood is to cut boards of high grade balsa wood into thin, veneer-like sheets, the standard stock size being a sheet one-sixteenth of an inch thick, three inches in width and a yard in length. When, as is sometimes the case, one needs broader sheets, then three-inch wide pieces have to be joined together; for the maximum produceable width of these pieces under existing conversion techniques is limited by the relatively small diameter of balsa wood trees when they attain cutting maturity.

Balsa wood sheets, as presently produced, are relatively expensive, this being due in large part to the low yield obtained from balsa logs using conventional conversion techniques in which the logs must first be reduced to boards which are then cut into sheets. With such techniques, the amount of balsa convertible into usable board is usually less then half the total volume of wood in the log. This is due to the constraint that only rectangular or square pieces can be cut from a cylindrical log to produce a board that has a rectangular form. To this end, a series of longitudinal cuts are made through the log to produce so-called "flat-sawn" pieces whose broad faces lie in a plane parallel to a tangent to the cylindrical periphery of the log.

Flat pieces not only give rise to substantial amounts of wood waste, but such pieces tend to warp during the kiln-drying process. An even when adequately dried, flat sawn pieces undergo dimension changes as a result of variations in air moisture or relative humidity, so that the final product may become deformed.

The typical board thickness required by the trade is three inches. In producing boards by the traditional conversion technique, it is difficult to produce pieces of the required thickness that are also wide. Since balsa wood trees do not attain a diameter much greater than one foot at cutting maturity, it is obvious that in converting logs of one foot diameter into boards of three inches in thickness by the traditional technique, that these pieces will have a width averaging about four inches--especially when taking into account the waste encountered in kiln-drying as well as normal wood defects such as knots and grain distortion.

Thus in calculating the yield of balsa sheets derived from balsa logs, one must take into account not only the substantial losses resulting from the conversion of cylindrical logs into boards by the conventional flat-sawn conversion technique, but the further losses arising from the fact that only a portion of the resulting boards are of a quality acceptable for conversion into thin sheets.

It has been found that the actual yield of balsa sheets derived from logs using existing techniques runs as low as 8 percent. While balsa trees are fast-growing and reach cutting maturity in six to eight years, the plantations are almost all in South America. Rising transportation, labor and processing costs, coupled with the exceptionally low yield obtained from conventional conversion techniques are such as to make balsa wood in sheet form increasingly expensive.

Another drawback of conventionally-produced veneer-like sheets of balsa wood is that its flatness is subject to changing conditions of temperature and relative humidity in ambient air. This wood is always undergoing changes in moisture content, and when the wood is a thin sheet of balsa, long-term or seasonal changes may result in variations in moisture content causing warpage of the sheets.

Of particular interest is the prior patent to Newmark et al., U.S. Pat. No. 2,409,785, in which square bolts of balsa derived from a log are cut in a slicing machine into thin sheets suitable for model-making. While the technique disclosed in this patent overcomes some of the drawbacks of the prior art, it lacks the advantages of the present invention.

SUMMARY OF INVENTION

In view of the foregoing, the main object of this invention is to provide a high-yield, low-cost technique for converting balsa wood logs into thin sheets suitable for model-making or as light-weight plies for multi-ply plywood.

The most significant aspect of the present invention is that the yield obtainable from logs is seventy percent and higher, as compared to the ten percent or less yield realized from conventional sheet-producing techniques.

More particularly, it is an object of this invention to provide a conversion technique of the above type in which the sheet product is a flat, two-ply laminate whose thickness is equivalent to sheets obtainable by conventional sheet-producing techniques but whose structural width can be much greater; for the width of the two-ply laminate is not determined by the diameter of the log from which this product is derived.

Also an object of the invention is to provide a two-ply sheet of balsa wood that will not curve or cup as a result of daily or long-term changes in ambient temperature or relative humidity.

Briefly stated, in a technique in accordance with the invention, a balsa wood log is debarked and then cut to a standard bolt length. The bolt is then supported for rotation in a veneer lathe in which the surface of the bolt is engaged by the nose piece of a pressure bar while the blade of a knife bar enters the bolt at a point below its surface to peel off in spiral form a veneer of the desired thickness. As the lathe rotates, the bolt is converted into a continuous web of balsa veneer whose face on the nose piece side is tight or closed and whose face on the blade side is loose or open as a result of cracks or checks caused by the blade action.

After kiln-drying, dried sheets taken from the web are graded and clipped to a usable width, the sheets at this point having a distinct curvature as a result of their spiral memory. Then the sheets are assembled into matching pairs of opposing curvature, each pair of sheets being laminated together in face-to-face relation to produce a two-ply flat sheet whose planarity, upon exposure, is immune to changes in relative humidity and temperature.

OUTLINE OF DRAWINGS

For a better understanding of the invention as well as other objects and further features thereof, reference is made to the following detailed description to be read in conjunction with the accompanying drawings, wherein:

FIG. 1 is a transverse section taken through a veneer lathe for converting, in the manner of the present invention, prepared bolts of balsa wood into a web of sheet material;

FIG. 2 is a perspective view of the bolt, indicating the spiral peeling configuration resulting from the veneering operation;

FIG. 3 illustrates, in perspective, a single sheet of veneer after kiln-drying;

FIG. 4 shows a pair of matching veneer sheets prior to lamination, the curvatures being in concave face-to-face relation;

FIG. 5 shows a pair of matching veneer sheets prior to lamination, the curvatures being in convex face-to-face relation; and FIG. 6 shows a two-ply balsa sheet of assured planarity resulting from a technique in accordance with the invention.

DESCRIPTION OF INVENTION

In a high-yield, low-cost technique in accordance with the invention, logs of balsa wood of cutting maturity having a diameter of about 12 to 15 inches are cut from a balsa tree, the logs have a natural bark thereon which is left untouched until the log is ready for processing at a veneer plant equipped with a veneer lathe of the type shown in FIG. 1.

At the veneer plant, the bark is stripped off the logs. This operation is relatively simple with balsa; for the tree grows under tropical conditions and is always "in sap;" hence it is not difficult to remove the bark therefrom.

Bolts 10 of the length required (i.e., 36 inches) are cut from the debarked log and are either put in the veneer lathe directly or first soaked in hot water for a period sufficient to condition the bolt for the subsequent peeling operation in the lathe.

In the veneer lathe, bolt 10 is clamped and supported for rotation between a pair of chucks 11, the bolt being rotated against the cutting edge of a knife 12 and a nose bar 13 advancing in the horizontal direction toward the bolt. Knife 12 is held in a knife bar 14 provided with an adjusting screw 21 for setting the knife position, the knife being secured to the bar by a cap 15 coupled to the bar by a bolt 16.

Nose bar 13 is held in a pressure bar 17 provided with a horizontal-position adjusting screw 18 and a vertical-position adjusting screw 19. The nose bar is secured to the pressure bar by a cap 20. Pressure bar 17 and knife bar 14 constitute the principal components of a knife carriage.

The cutting edge of knife 12 penetrates below the surface of bolt 10 to sever the veneer V from the bolt. Pressure nose 13 engages the surface of the bolt to compress the wood, the maximum compression occurring ideally just ahead of the knife edge. This compression minimizes splitting of the wood ahead of the knife, it reduces breaks in the veneer surface from the knife side and forces the knife bar assembly against the adjacent feed mechanism, thereby helping control veneer thickness. The pressure bar is important in controlling the roughness, the depth of the checks and the thickness of the veneer.

Veneer V on its side $V_l$ facing the knife exhibits fine cracks or checks as a result of the cutting action which opens up the wood. This side is therefore referred to as the "loose" or "open" side. Veneer V on its opposite side $V_t$ facing the pressure nose is not mutilated by the knife edge and is therefore referred to as the "closed" or "tight" side. The checks on the loose side and the absence of checks on the tight side will create a structural imbalance, causing the veneer to curve once it is dried. It is therefore virtually impossible with balsa wood to produce on a veneer lathe a thin veneer sheet of one-thirty second, one-sixteenth, or three-thirty seconds of an inch thickness that will stay perfectly flat. While it is possible to minimize curving or cupping of the balsa sheets by drying the sheets under heat and pressure to produce flat sheets, its planarity is not assured by this procedure; for under exposure to variations in the temperature and relative humidity of the air, the wood will gain or lose moisture and proceed to curve.

The moisture content of wood below the fiber saturation point or "green" condition depends on both the relative humidity and temperature of the surrounding air. When the moisture content of wood is such that it is neither gaining nor losing moisture, this condition is referred to as the equilibrium moisture content. The U.S. Forest Products Laboratory at Madison, Wisconsin has published a table setting forth the relationshp between equilibrium moisture content, relative humidity and temperature, this table being applicable for most practical purposes to wood of any species. From this table it is evident that below the fiber saturation point, wood will reach a moisture content in equilibrium under widely differing atmospheric conditions.

In service, wood is exposed to both long term or seasonal as well as short term or daily changes in relative humidity and temperature of the surrounding air. Wood changes dimension as it gains or loses moisture below its fiber saturation point, for it shrinks when losing moisture from its cell walls and swells when gaining moisture. This shrinking and swelling may result in warping, checking and splitting of the wood structure.

But changes in ambient air conditions are not the only factor responsive for balsa wood curvature in a veneer derived from a veneer lathe. As shown in FIG. 2, veneer V is peeled off from bolt 10 in a spiral configuration $S_p$, and the continuous web of veneer so produced retains a memory of this configuration, causing the wood veneer to seek to return to its initially curved formation. This natural tendency of the veneer web to curve is accentuated by the imbalance in the wood structure as a result of its tight condition on one side and its loose condition on the opposite side.

Assuming a bolt 10 having a length of 36 inches to produce standard sheets of this size, it will be seen that veneer web V then has a width of 36 inches and a thickness depending on the setting of the lathe, which we shall assume to be such as to produce a one-thirty second inch thickness. Web V is continuous, and its ultimate length is determined by the thickness of the cut and the diameter of the bolt (between 12 and 15 inches). With this arrangement, sheets derived from the veneer web are not limited in width by the diameter of the bolt, as in prior techniques, but may be in any useful width that can greatly exceed the usual three-inch width.

It is also to be noted that the yield from the present technique is much higher than with prior techniques; for while it is not feasible with a veneer lathe to derive useful veneer from the central core of the bolt, the useful yield is nevertheless as high as about 70%. In other words, one is not required, as in the prior technique, to first convert a log into boards with the high degree of waste incident to the operation, and then cut the boards into sheets with further waste; but one peels the log into a continuous web which is cut into sheets.

The green sheets of veneer V derived from the lathe operation, which have a relatively high moisture content, may be dried in a regular veneer drying which can be a tunnel-like through-feed mechanism. Or a "batch" type dryer may be used in which all sheets are dried in a conventional kiln. This drying procedure acts to reduce the moisture content of the sheets to 12% or less, this being standard practice in the lumber industry. The moisture content of a piece of wood, in terms of percentage, is determined by its oven-dried weight subtracted from its wet weight divided by its oven-dried weight times 100.

The steps necessary to kiln-dry wood and recommended practices therefor are set forth in publication #188 of the U.S. Department of Agriculture, Forest Service, Forest Products Laboratory.

The kiln-dried sheets are then graded and clipped to a usable width. In practice, sheets derived from a common bolt are kept together, for these sheets then share like wood characteristics. The sheets may, at this point, be subjected to slight sanding to improve the finished product, and then assembled into matching pairs, in the manner hereinafter explained.

A typical sheet $S_1$ of veneer is shown in FIG. 3, where it will be seen that the sheet has a distinct curvature in its transverse plane. This curvature, as previously noted, is partially due to the imbalance caused by structural difference between the loose and tight sides of the lathe-cut sheet. The small cracks on the loose side will expand or contract in response to changes in relative humidity.

This curving or cupping is also accentuated by the expansion that normally occurs after kiln-drying. And in addition to these factors, the lathe-peeled wood has a memory of its spiral formation and tends, therefore, to resume its curvature.

The next step in the technique in accordance with the invention is to match pairs of dried sheets, as shown in FIG. 4, where the match is between a pair of sheets $S_2$ and $S_3$ of like size, preferably taken from the same bolt, the sheets being in concave face-to-face relation. Alternatively, as shown in FIG. 5, the sheets $S_4$ and $S_5$ in the matching pair may be in convex face-to-face relation. In either case, the curvature of the two sheets in the pair are substantially the same and in opposed relation.

The matched pairs of sheets are thereafter laminated together under pressure, use being made for this purpose either of a cold-setting or hot-setting glue or adhesive to produce, as shown in FIG. 6, a two-ply sheet $S_{2p}$ which is perfectly flat. In practice, each ply has a thickness of one-thirty second of an inch to produce a total thickness of one-sixteenth of an inch, which is the standard thickness for model making. The resultant sheet is sanded and trimmed, as required, to provide a commercially-acceptable finished product suitable not only for model-making but also for multi-ply light-weight plywood.

In practice, one may pre-coat the sheets to be laminated together with a heat-activatable resin, and thereafter carry out lamination under heat and pressure to activate and cure the impregnant.

Because the plies of the two-ply sheet are derived from veneer sheets having opposing curvatures which balance out, changes in relative humidity and temperature in the ambient air, which would otherwise tend to develop a curvature of the plies, are cancelled out in the two-ply structure. As a consequence, the two-ply sheet of balsa veneer has a planarity which is substantially immune to atmospheric changes.

While there has been shown and described preferred embodiments of a method of producing thin balsa wood sheets in accordance with the invention, it will be appreciated that many changes and modifications may be made therein without, however, departing from the essential spirit thereof.

I claim:

1. A technique for converting logs cut from balsa wood trees into two-ply sheets which are substantially immune to changes in relative humidity and ambient temperature, the technique comprising the steps of:

A stripping the bark from the logs;

B cutting the debarked logs into bolts of a predetermined length, each bolt being cut in a veneer lathe to produce a continuous web of veneer;

C slicing each web into green sheets of veneer;

D kiln-drying the green veneer sheets to produce dried sheets having a curvature due to the cutting and drying operations;

E assembling the curved dried sheets having opposing curvatures into matched pairs whose curvatures are in face-to-face relationship, the sheets in each pair being derived from a common web whereby they share like wood characteristics; and F laminating the sheets in each pair together to produce two-ply flat sheets suitable for model making and for forming light-weight multi-ply plywood, the two-ply flat sheets having a planarity which is substantially immune to atmospheric changes.

2. A technique as set forth in claim 1, wherein said bolts are first soaked in hot water to condition the bolts before veneering.

3. A technique as set forth in claim 1, wherein the curved dried sheets in each matched pair are in concave face-to-face relation.

4. A technique as set forth in claim 1, wherein the cured dried sheets in each pair are in convex face-to-face relation.

5. A technique as set forth in claim 1, wherein said lamination is effected by pre-coating the sheets with a heat-activatable resin adhesive, and the pre-coated sheets are then subjected to heat and pressure to activate and cure said adhesive to form the two-ply sheet.

6. A two-ply flat sheet whose planarity is immune to changes in atmospheric conditions produced by the technique set forth in claim 1.

7. A two-ply sheet as set forth in claim 6, in which each ply has a thickness of one thirty-second of an inch.

* * * * *